US008316055B2

(12) United States Patent
Warner et al.

(10) Patent No.: US 8,316,055 B2
(45) Date of Patent: Nov. 20, 2012

(54) SYSTEM AND METHOD TO MANAGE STORAGE OF DATA TO MULTIPLE REMOVABLE DATA STORAGE MEDIUMS

(75) Inventors: Adrian Warner, Delafield, WI (US); Claudio Mejia, Wauwatosa, WI (US); Timothy Stiemke, West Bend, WI (US)

(73) Assignee: General Electric Company, Schenectady, NY (US)

( * ) Notice: Subject to any disclaimer, the term of this patent is extended or adjusted under 35 U.S.C. 154(b) by 449 days.

(21) Appl. No.: 12/557,134

(22) Filed: Sep. 10, 2009

(65) Prior Publication Data
US 2011/0060772 A1 Mar. 10, 2011

(51) Int. Cl.
*G06F 7/00* (2006.01)
*G06F 17/30* (2006.01)
(52) U.S. Cl. ........ 707/790; 707/792; 707/795; 711/161; 711/162
(58) Field of Classification Search .................. None
See application file for complete search history.

(56) References Cited

U.S. PATENT DOCUMENTS

| | | | |
|---|---|---|---|
| 7,225,211 B1 * | 5/2007 | Colgrove et al. | 707/693 |
| 7,603,530 B1 * | 10/2009 | Liikanen et al. | 711/162 |
| 7,685,360 B1 * | 3/2010 | Brunnett et al. | 711/112 |
| 2002/0087588 A1 * | 7/2002 | McBride et al. | 707/204 |
| 2004/0044854 A1 * | 3/2004 | Gibble et al. | 711/154 |
| 2006/0294336 A1 * | 12/2006 | Gibble et al. | 711/171 |
| 2007/0180208 A1 * | 8/2007 | Yamasaki | 711/162 |
| 2008/0133767 A1 * | 6/2008 | Birrer et al. | 709/231 |
| 2008/0270188 A1 * | 10/2008 | Garg et al. | 705/3 |
| 2009/0055608 A1 * | 2/2009 | Yamasaki | 711/162 |
| 2009/0096876 A1 * | 4/2009 | Herberger et al. | 348/207.1 |

OTHER PUBLICATIONS

"Digital Preservation Guidance Note: 3," Care, Handling and Storage of Removable Media. <http://www.nationalarchives.gov.uk/documents/removable-media-care.pdf> (Aug. 2008).

* cited by examiner

*Primary Examiner* — Angelica Ruiz
(74) *Attorney, Agent, or Firm* — Fletcher Yoder, P.C.

(57) ABSTRACT

A system and method to manage data acquired from a medical device is provided. The system can detect a spare capacity to store a file of data associated with a unique patient identifier acquired from the medical device to a first removable data storage medium, can detect the first removable data storage medium to be below a threshold spare capacity to receive the file of data associated with unique patient identifier acquired from the medical device, and can automatically cause to stop communicating data for storage to the first removable data storage medium and to start communicating the file of data associated with the unique patient identifier for storage to a second removable data storage medium, and can create a graphic display illustrative of the removable data storage medium that is active to receive the file of data associated with the unique patient identifier.

16 Claims, 8 Drawing Sheets

SYSTEM AND METHOD TO MANAGE STORAGE OF DATA TO MULTIPLE REMOVABLE DATA STORAGE MEDIUMS

BACKGROUND

This invention generally relates to a system and method to manage storage of data on a computer-readable storage medium, and more specifically to a system and method to map the storage of data to a series of removable, computer-readable storage media.

Known removable computer readable storage media include DVD or CDROM type devices, and solid-state memory devices similar to that offered in the consumer market for Cameras, portable media devices and so forth. Solid-state memory can be desired for its small physical size, high speed read/write, and long life associated with low optical degradation The subject matter described herein relates to medical devices that include removable data storage media to store and record generally real-time acquired data, images, patient information and other application specific data. Solid-state memory may be desired for medical imaging equipment because of benefits associated with secure archives, rapid access, and ability to archive quality media at a reasonable price. Capacities of known solid-state memory cards employed in medical equipment can range between 2.0 GB up to 32 GB, with a theoretical capacity up to 2048 GB.

Known medical devices and systems employ removable storage media (e.g., DVD, CDROM or optical type storage devices) to store and archive the large amounts of data associated with delivery healthcare. Drawbacks of known removable storage devices can include the fill-up or reach of capacity and need to exchange during the delivery of healthcare. This exchange can require complicated system design and execution to assure that data is not lost once the removable storage media may be filled to it limits. This exchange can also increase opportunities or likelihood of data loss in the event of a malfunction, as well as distract the operator or physician during the delivery of healthcare to the patient.

BRIEF DESCRIPTION

The above-mentioned drawbacks and needs are addressed by the embodiments described herein in the following description. The claimed subject matter of the system and method described herein creates a sequence of storage of data into a series of memory devices that can enable seamless and uninterruptible storage of acquired data throughout delivery of healthcare (e.g., medical procedure) to the patient associated with archiving of events, data, and actions taken during the procedure.

An embodiment of a system in communication with a medical device is provided. The system comprises a first and second removable data storage mediums independent of one another; a database independent of the plurality of removable data storage mediums; a graphic display; and a controller in communication with the plurality of removable data storage medium, the graphic display, and the medical device, the controller including a memory in communication with a processor, the memory including a plurality of computer readable program instructions for execution by the processor to perform the steps of: detecting if a spare capacity to store a file of data associated with a unique patient identifier acquired from the medical device to the first removable data storage medium, storing a first list of identifiers of files of the data stored to the first removable data storage medium correlated to a first identifier of the first removable data storage medium, the first list of identifiers of files stored in the database, detecting the first removable data storage medium to be below a threshold spare capacity to receive the file of data associated with unique patient identifier acquired from the medical device, automatically causing to stop communicating data for storage to the first removable data storage medium and to start communicating the file of data associated with the unique patient identifier for storage to the second removable data storage medium, storing a second list of files of the data stored to the second removable storage medium correlated to a second identifier of the second removable data storage medium, the second list stored to the database, and creating a graphic display illustrative of the first removable data storage medium to be above a threshold capacity and discontinued receipt of additional data for storage, as well as illustrative of the second removable data storage medium as active to receive the file of data associated with the unique patient identifier.

An embodiment of a method to manage data acquired from a medical device is provided. The method comprises the steps of: detecting if a spare capacity to store a file of data associated with a unique patient identifier acquired from the medical device to a first removable data storage medium, storing a first list of files of the data stored to the first removable data storage medium correlated to a first identifier of the first removable data storage medium, the first list stored a database, detecting the first removable data storage medium to be below a threshold spare capacity to receive the file of data associated with unique patient identifier acquired from the medical device, automatically causing to stop communicating data for storage to the first removable data storage medium and to start communicating the file of data associated with the unique patient identifier for storage to a second removable data storage medium, storing a second list of files of the data stored to the second removable storage medium correlated to a second identifier of the second removable data storage medium, the second list stored to the database, the database independent of the first and second removable data storage mediums, and creating a graphic display illustrative of the first removable data storage medium to be above a threshold capacity and closed to receiving additional data for storage, as well as illustrative of the second removable data storage medium as active to receive the file of data associated with the unique patient identifier.

Systems and methods of varying scope are described herein. In addition to the aspects and advantages described in this summary, further aspects and advantages will become apparent by reference to the drawings and with reference to the detailed description that follows.

DETAILED DESCRIPTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
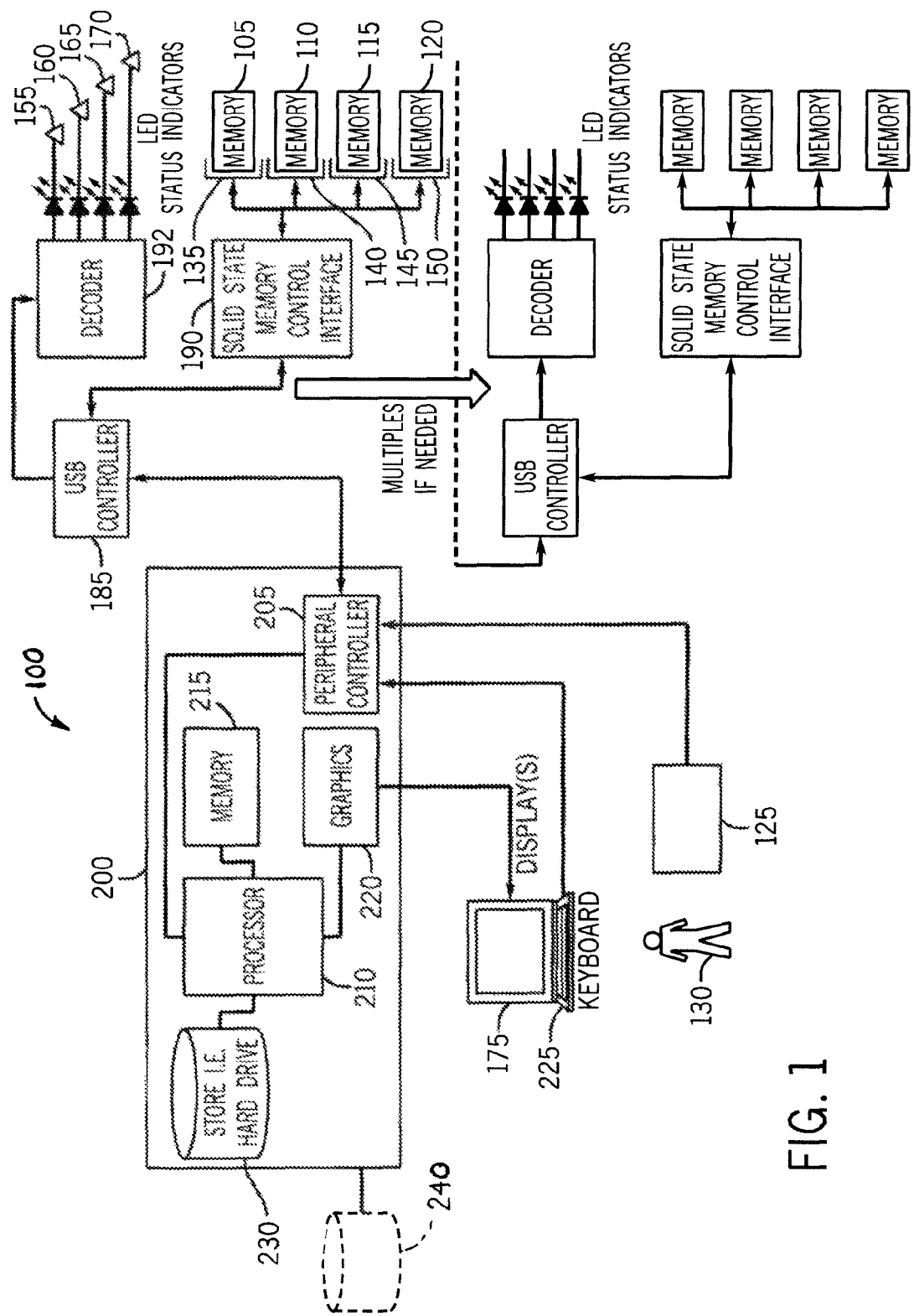
FIG. 1 shows a schematic diagram of one embodiment of a system operable to archive and automatically switch from one removable data storage medium to another according to the subject matter described herein.

FIG. 1 illustrates one embodiment of a system 100 operable to archive and automatically switch storing acquired medical data from one of a series of removable data storage medium 105, 110, 115, 120 to another according to the subject matter described herein. The system 100 can be a stand-alone device or integrated with or connected (e.g., broadband, wireless, network, etc.) in communication to acquire medical data from a medical device 125 (e.g., imaging system) employed in the delivery of healthcare to a patient 130. The system 100 can be capable of archiving and automatic switching the store of medical data acquired via general real-time communication signals or historical medical data not acquired in general real-time. The term "general real-time" as used in regard to the acquisition, store and display of data refers to acquisition, store, and display without intentional delay, given the processing limitations of the system 100 and the time required to accurately measure the data.

An embodiment of the removable data storage medium 105, 110, 115, 120 can include physical material which can be removed from a data reader device, conferring portability on the data it carries and can include, for sake of example, solid state semiconductor media; solid state storage media (SSSM); optical discs such as CDs, DVDs, or blue ray discs; flash memory such as memory sticks, floppy discs, zip disks, secure digital cards, or USB drives; etc. operable to store data in various formats of data including, for sake of example, that may contain HTML and XML encoding, combined in a plain text file format, using either a EBCDIC or ASCII character encoding, on a UDF digitally formatted disk.

Data as used herein can refer to packets, files, or continuous stream of bytes of information or other form of signal (optical or digital or analog) communicated over a hardwire or wireless connection.

An embodiment of the system 100 can be configured or interfaced to acquire data from the computer hardware architecture of the medical device (e.g., imaging system) 125. The illustrated embodiment of the system 100 includes series of slots 135, 140, 145, 150 configured to receive the series of removable data storage mediums 105, 110, 115, 120, respectfully. An embodiment of the slots 135, 140, 145, 150 can include hardware interfaces configured to receive electrical connection to communicate to each of the series of removable data storage memory devices 105, 110, 115, 120.

Each of the series of slots 135, 140, 145, 150 can also be connected in communication with a series of indicators 155, 160, 165, 170 associated with the respective removable data storage mediums 105, 110, 115, 120. Each of the series of indicators 155, 160, 165, 170 can be located either with the respective removable data storage memory devices 105, 110, 115, 120, or alternatively on a graphic display of an output device 175 (e.g., screen, monitor, touch-screens or graphic interfaces, kiosks, dashboards, etc. or other nearby indicator display). An embodiment of the indicators 155, 160, 165, 170 (e.g., LEDs, graphic icons or representations, etc.) can be operable to visually illustrate an indication of read/write access to, active use or operation of, and a capacity of each respective removable data storage medium 105, 110, 115, 120. These indicators 155, 160, 165, 170 can also be operable to illustrate a status (e.g., full or at capacity) of the respective removable data storage medium 105, 110, 115, 120 so as to allow the user to understand or determine or be given notice as to when to remove the respective removable data storage medium 105, 110, 115, 120 and replace with another new removable data storage medium having available capacity.

Figure 2:
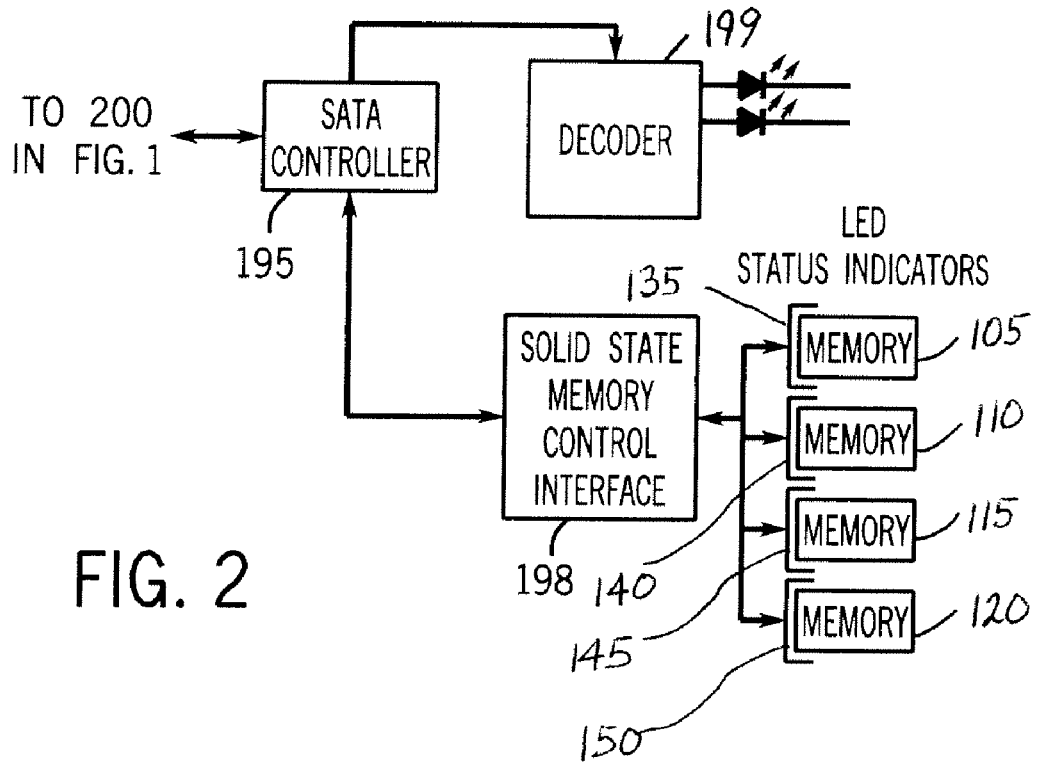
FIG. 2 illustrates a schematic diagram of an alternative embodiment of the system shown in FIG. 1.

Referring to FIG. 2, the embodiment of the system 100 can also include an archive or mechanical storage apparatus (e.g., cabinet) 180 to receive the removable data storage devices 105, 110, 115, 120 after reaching status of full capacity and respective removal and automatic switching to another. According to one example, the series of removable data storage mediums 105, 110, 115, 120 can be arranged in the archive 180 as a map correlated to a series of drives of the medical devices 125 providing medical data to the system 100.

Referring back to FIG. 1, the embodiment of the system 100 can also include a USB controller 185 in connection via a memory control interface 190 (e.g., solid state memory control interface) to communicate with each of the series of removable data storage mediums 105, 110, 115, 120 and indicators 155, 160, 165, 170. The USB controller 185 can be generally configured to convert high-speed communications from the removable data storage mediums 105, 110, 115, 120. A decoder 192 can be connected in communication to translate signals representative of instructions or data received via the USB controller so as to control illumination of one or more of the respective indicators 155, 160, 165, 170.

Figure 3:
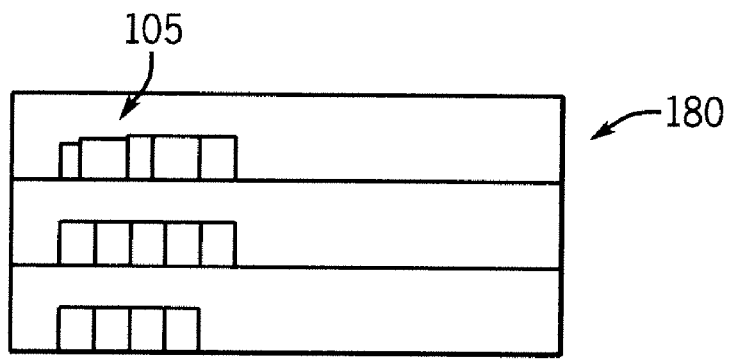
FIG. 3 shows an embodiment of an archive to receive the plurality of removable data storage mediums after use on the system shown in FIG. 1.

As shown in FIG. 3, an alternative embodiment of the system 100 can include a SATA control interface 195 in connection via a memory control interface 198 and decoder 199 (in a similar manner to the construction described in FIG. 2) so as to communicate with the series of removable data storage mediums 105, 110, 115, 120 and indicators 155, 160, 165, 170.

Referring back to FIG. 1, the USB controller 185 can be connected in communication with a controller 200, as well as with other USB controllers and memory control interfaces associated with multiple sets or series of additional removable data storage mediums in a manner of similar construction and communication as of the USB controller 185, memory control interface 190, and decoder 192 with respect to the removable data storage mediums 105, 110, 115, 120 and indicators 155, 160, 165, and 170.

An embodiment of the controller 200 can be computer having a peripheral controller 205 in communication with the processor 210, memory 215, and a graphics module 220 to create graphic displays for illustration on the output device 175. The peripheral controller 205 can also be connected to receive communications from an input device 225 (e.g., keyboard, mouse device, touch-screen, etc.).

The processor 210 generally configured to execute program instructions stored in the memory 215. Although the processor 210 and memory 215 are shown at the controller 200, it should be understood that the processor 210 or memory 215 or portions thereof can be located independent of the controller 200. An embodiment of the memory 215 can be generally operable to receive updated values or measurements of acquired data from the medical device 125 on a continuous or periodic basis.

The system 100 can also include a hard-drive 230 operable to store a registry 235 of that correlates files stored to which removable data storage mediums 105, 110, 115, 120 for later reference or recall. An embodiment of the hard-drive 230 can be part of the controller 200 or independent thereof. The system 100 can further include a backup storage medium 240 operable to store acquired data or registries/directories thereof by the system 100. An example of the backup storage medium 240 can include physical material (e.g., magnetic tape, magnetic disc drive, solid state semiconductor memory, etc.) operable to store an electronic format of data for later retrieval.

An embodiment of the controller 200 can include a MICROSOFT WINDOWS® or similar platform capable to store acquired files from the medical device 125. Yet, it should be understood that the system 100 can employ other operating platforms instead of or in combination with MICROSOFT WINDOWS®, including but not limited to LINUX®, SOLARIS®, and APPLE® operating platforms, and is not limiting on the subject matter described herein.

Figure 4:
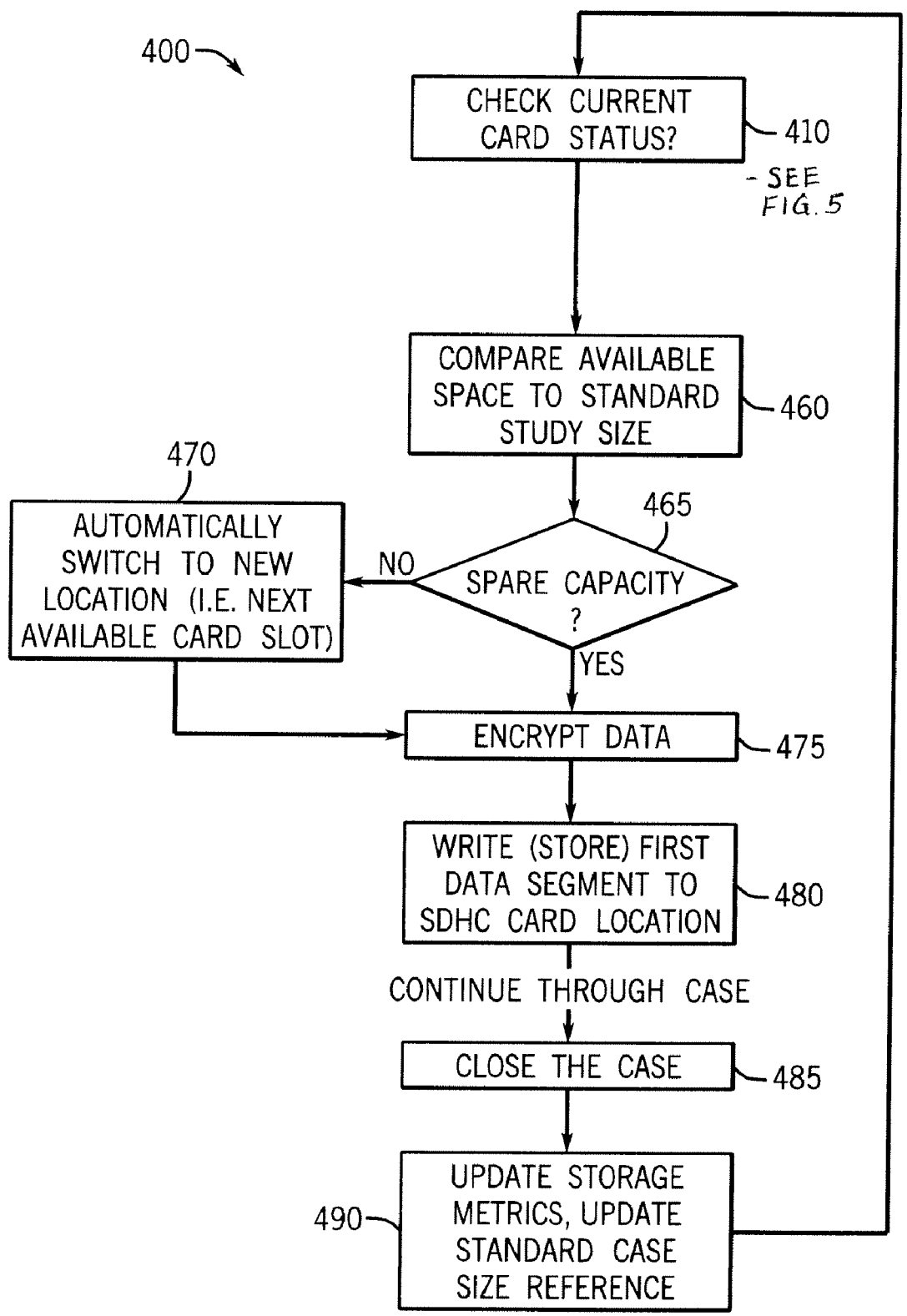
FIG. 4 shows a schematic flow diagram of an embodiment of a method of operation of the system of FIG. 1.

Having provided the above general description of the construction of the system 100, FIG. 4 includes a schematic flow diagram illustrating an embodiment of a method 400 of operation of the system 100 to automatically assign and switch destination of storage of a continuous or periodic data stream to among a series of removable data storage mediums 105, 110, 115, 120. It should be understood that the sequence of the acts or steps of the method 400 as discussed can vary. Also, it should be understood that the method 400 may not require each act or step in the foregoing description, or may include additional acts or steps not disclosed herein. It should also be understood that one or more of the steps of the method 400 can be represented as computer-readable program instructions that may include portions to be stored in the memory 215 or for execution by the processor 210 and portions stored at the medical device or system 125.

Assume for sake of example that the system 100 can be connected in communication receive data from the medical device or system 125 (e.g., radiography, CT, magnetic resonance (MR) imaging, ultrasound (U/S), picture archival system (PACS), etc.).

Referring to FIG. 4, an embodiment of step 410 can include detecting or identifying a status of the available space (e.g., 1 Gigabyte of data) for the removable data storage medium connected to acquire data during operation of the medical device or system 125. Step 410 can include creating or generating a map visually illustrative of the series of removable data storage mediums 105, 110, 115, 120 of the system 100 to types of acquired data from the medical device 125. For example, one of the removable data storage mediums 105 can be designated or assigned to receive only data for storage related to medical device 125 operating parameters or default settings, while another medium 110 can be designated or assigned to receive only data for storage related to the patient (e.g., image acquisition data, laboratory results, electrophysiological or electrocardiogram monitoring data, etc.). Yet, both types of the above-described acquired files of data or data can be correlated to a time of acquisition and the patient identifier.

Figure 5:
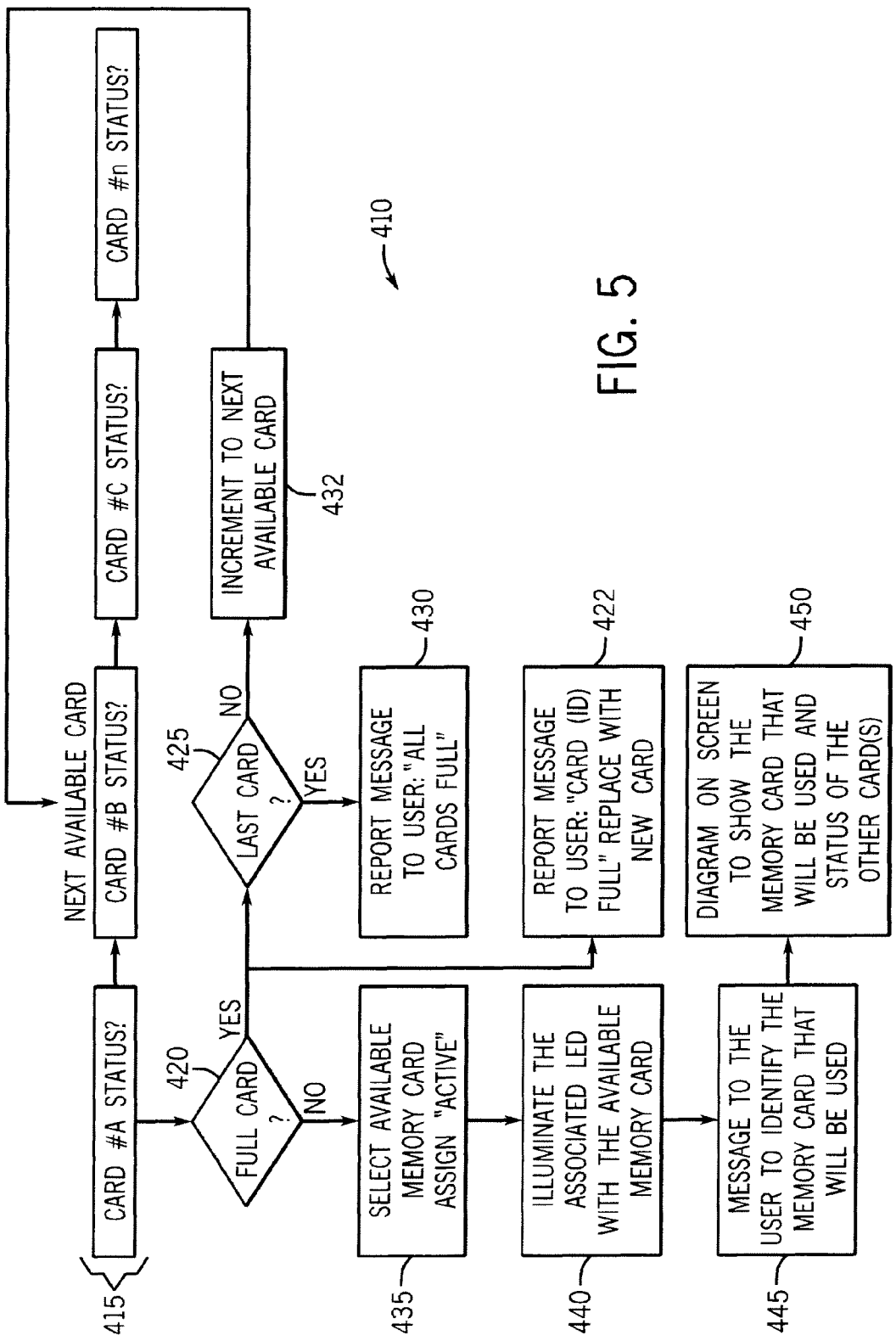
FIG. 5 shows a schematic flow diagram of an embodiment of a method of operating at startup of the system of FIG. 1.

One embodiment of step 410 is illustrated in a schematic flow diagram in FIG. 5 to be executed at power-up or start-up or of the system 100. Referring now to FIG. 5, step 415 can include calculating or detecting a status or available space for each of the series of removable data storage mediums 105, 110, 115, 120. Assume that only one of the series of the removable data storage mediums 105, 110, 115, 120 can be connected or configured or active to presently acquire data from the medical device or system 125, and remainder of the series can be on a standby/inactive status such that unavailable to receive data until a change of status.

Step 420 can include comparing the status or available space for the one of the series of removable data storage medium 105, 110, 115, 120 to a threshold (e.g., percentage or value of spare capacity). If the status or available space meets or falls below the threshold spare capacity of available space to receive and store data, then step 422 can include generating or creating a display indicative or graphic representation that the one of the series of data storage mediums 105, 110, 115, 120 may be below the threshold spare capacity and thereby full and unavailable to receive and store additional data (e.g., graphic representative "FULL").

Step 425 can include detecting or identifying if the one of the series of storage mediums 105, 110, 115, 120 can be the last available or last in the sequence of the series of the storage mediums 105, 110, 115, 120. If detected to be the last available or last in the sequence, step 430 can include creating generating a display indicative of or that includes a graphic representation that all in the series of data storage mediums 105, 110, 115, 120 recognized in the system 100 are not available because below the threshold spare capacity (e.g., "ALL STORAGE MEDIUM FULL") to receive additional data for storage. If step 425 includes detecting or identifying another available or next in the sequence of the series of data storage mediums 105, 110, 115, 120, step 432 can include identifying or detecting a next in sequence of the series of removable storage mediums 105, 110, 115, 120 to receive storage of data acquired from the medical device 125.

Still referring to FIG. 5, if step 420 includes detecting or identifying the status or available space for the one of the series of removable data storage mediums 105, 110, 115, 120 to be above the spare threshold capacity so as to include available space to receive and store more data, step 435 can include assigning a status of "ACTIVE" such that the one of the series of data storage mediums 105, 110, 115, 120 can be operable to receive storage of data from the medical device 125.

Step 440 can include creating a graphic illustration or display to show and identify which one of the series of removable data storage mediums 105, 110, 115, 120 can be active and available to receive data.

Step 445 can include creating or communicating a graphic illustration or display to show the user that the one of the series of data storage mediums 105, 110, 115, 120 will be configured active to receive the data from the medical device or system 125. Step 450 can include creating a graphic illustration or display to show the series of the removable data storage mediums 105, 110, 115, 120 of the system 100, and which selected one of the series of the data storage mediums 105, 110, 115, 120 will receive the data communicated from the medical device or system 125 relative to the remainder of the series of the data storage mediums 105, 110, 115, 120 that will not receive data.

Referring back to FIG. 4, with receiving of the continuous or periodic data from the medical device or system 125, the step 460 can include comparing the available space in the one of the removable data storage medium 105, 110, 115, 120 relative to a size of data in standard case study (e.g., standard size of bytes or percentage of total or present capacity of one of the removable data storage mediums). Step 465 can include calculating or detecting an available capacity of the one of the series of removable storage mediums 105, 110, 115, 120 to receive the size of the data of the standard case study or actual size of the acquired data file. If in step 465 includes calculating an insufficient available space of the one of the series of storage mediums 105, 110, 115, 120 or below the threshold, step 470 can include automatically switching or activating the next available or in the sequence of the series of data storage mediums 105, 110, 115, 120 to receive the storage of data.

Step 475 can include encrypting the data received from the medical device or system 125 to be stored on the one of the series of removable data storage mediums 105, 110, 115, 120. Step 480 can include writing or storing the acquired data to the one of the series of removable data storage mediums 105, 110, 115, 120 configured to receive or designated with the active status. Upon receipt of the last segment of data of the case acquired from the medical device or system 125, step 485 can include closing the case or grouping or file of the acquired data from the medical device or system 125. Step 490 can include updating the stored or threshold standard case size reference, and returning to step 410.

Figure 6:
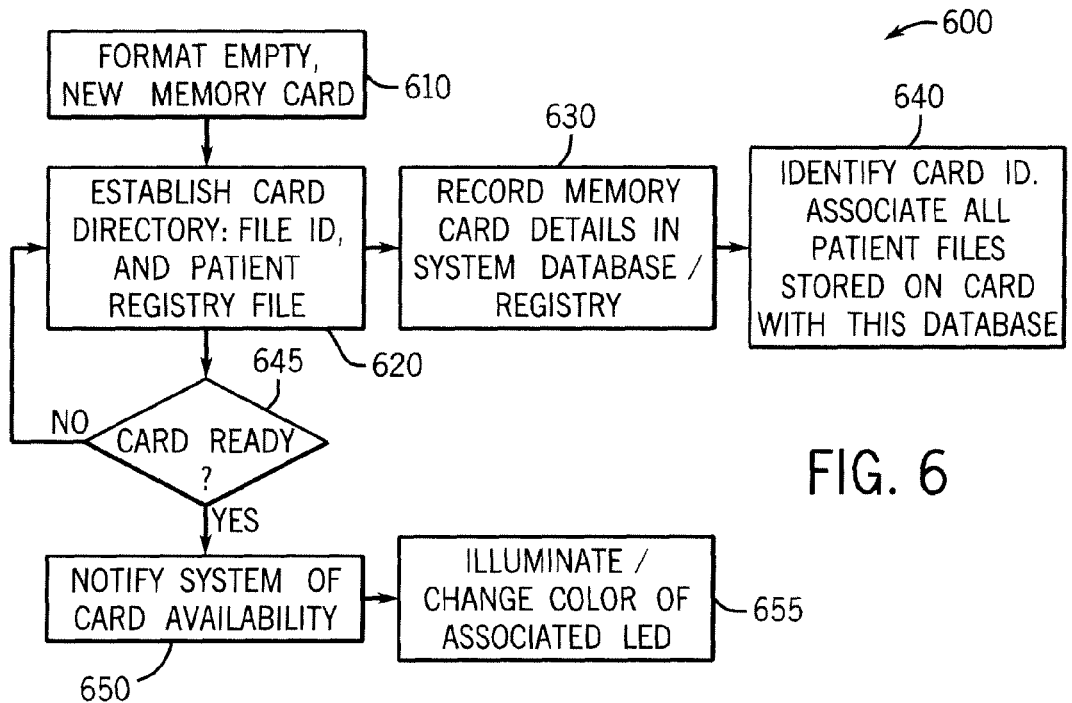
FIG. 6 shows a schematic flow diagram illustrative of an embodiment of a method of addition of removable data storage mediums to the system of FIG. 1.

FIG. 6 illustrates an embodiment of a method 600 to add a new removable data storage medium to the system 100, or to replace one of the series of data storage mediums 105, 110, 115, 120 described above. Step 610 includes formatting an empty removable data storage medium 105, 110, 115, 120 to receive data. Step 620 can include creating a directory to organize and receive file identifiers and the patient registry file to organize the acquired data from the medical device 125 that is stored on the respective removable data storage medium 105, 110, 115, 120. Step 630 can include recording or storing details of the directory and respective file identifiers and patient registry file to the database for later reference, where the database can include the hard-drive 230, the backup medium 240 or another of the removeable data storage mediums 105, 110, 115, 120. Step 640 can include recording the identifier for each of the removable data storage mediums 105, 110, 115, 120, and storing an association of each patient data file or registry relative to the identifier of the removable data storage medium 105, 110, 115, 120 that stored in.

Step 645 can include executing a verification check to determine that the removable data storage medium 105, 110, 115, 120 can be ready to receive data. Step 650 can include creating and communicating a signal representative of a notification to the system 100 that the removable data storage medium 105, 110, 115, 120 can be ready to receive data. Step 655 can include creating a graphic illustration to show the availability of the removable data storage medium 105, 110, 115, 120 to receive data.

Figure 7:
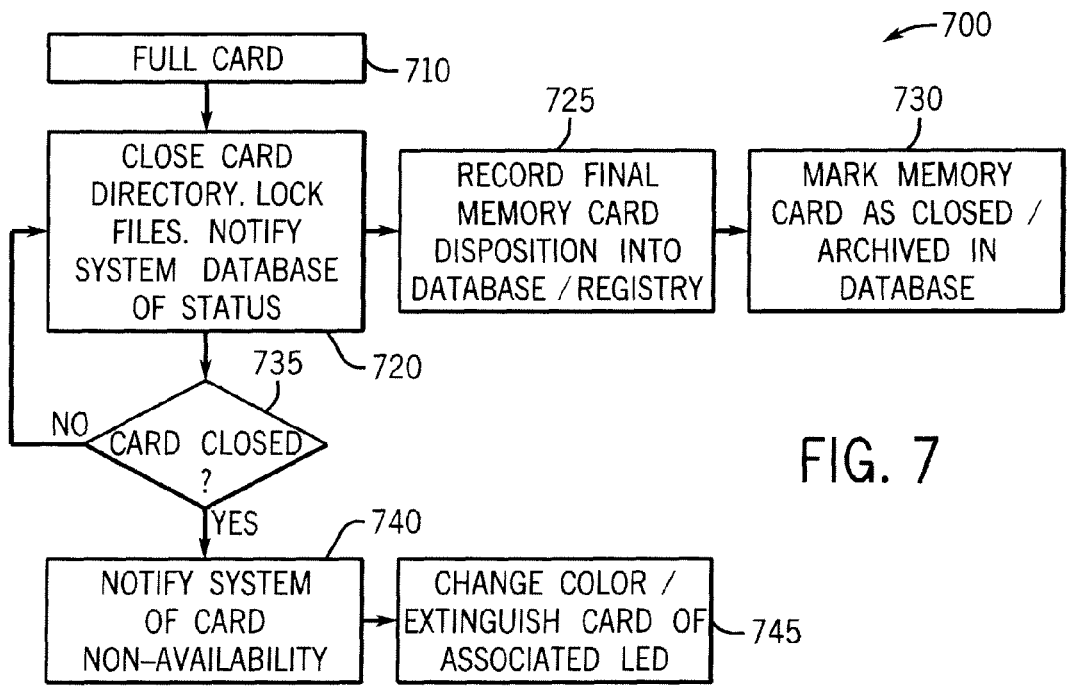
FIG. 7 shows a schematic flow diagram illustrative of an embodiment of a method of closing communicating of data to removable data storage mediums of the system of FIG. 1.

FIG. 7 refers to an embodiment of a method 700 to close an availability of one of the series of removable data storage medium 105, 110, 115, 120 to receive storage of data. Example of application of the method 700 can occur when the status of the removable data storage medium 105, 110, 115, 120 can be FULL and at or exceeding the threshold capacity to receive data. Step 710 includes detecting the status of the removable data storage medium 105, 110, 115, 120 to be FULL and at or exceeding the threshold capacity to receive data. Step 720 includes closing the directory of the removable data storage medium 105, 110, 115, 120 to receive new data files and locking the existing stored data files on the removable data storage medium 105, 110, 115, 120, and notifying the system 100 of the status of the removable data storage medium 105, 110, 115, 120 at capacity. Step 725 can include storing or recording a final disposition or registry of data stored to the removable storage medium 105, 110, 115, 120 at the database, where the database can include the hard-drive 230 or backup medium 240 or another of the removeable data storage mediums 105, 110, 115, 120. Step 730 can include marking the removable data storage medium 105, 110, 115, 120 with the "FULL" or at capacity status and archiving in the database 230 or 240 or another of the removeable data storage mediums 105, 110, 115, 120 of the system 100.

Step 735 can include verifying that the removable data storage medium 105, 110, 115, 120 as closed and unavailable to receive storage of data. Step 740 can include creating and communicating a notification to the controller 200 of the system 100 that the removable data storage medium 105, 110, 115, 120 can be unavailable to receive data. Step 745 can include creating a graphic illustration or display to show the user that the removable data storage medium 105, 110, 115, 120 can no longer available to receive storage of data. An embodiment of step 745 can include removing a graphic illustration or display representative of the status or availability of the removable data storage medium 105, 110, 115, 120 from view of the user with the closure step 735 described above.

Figure 8:
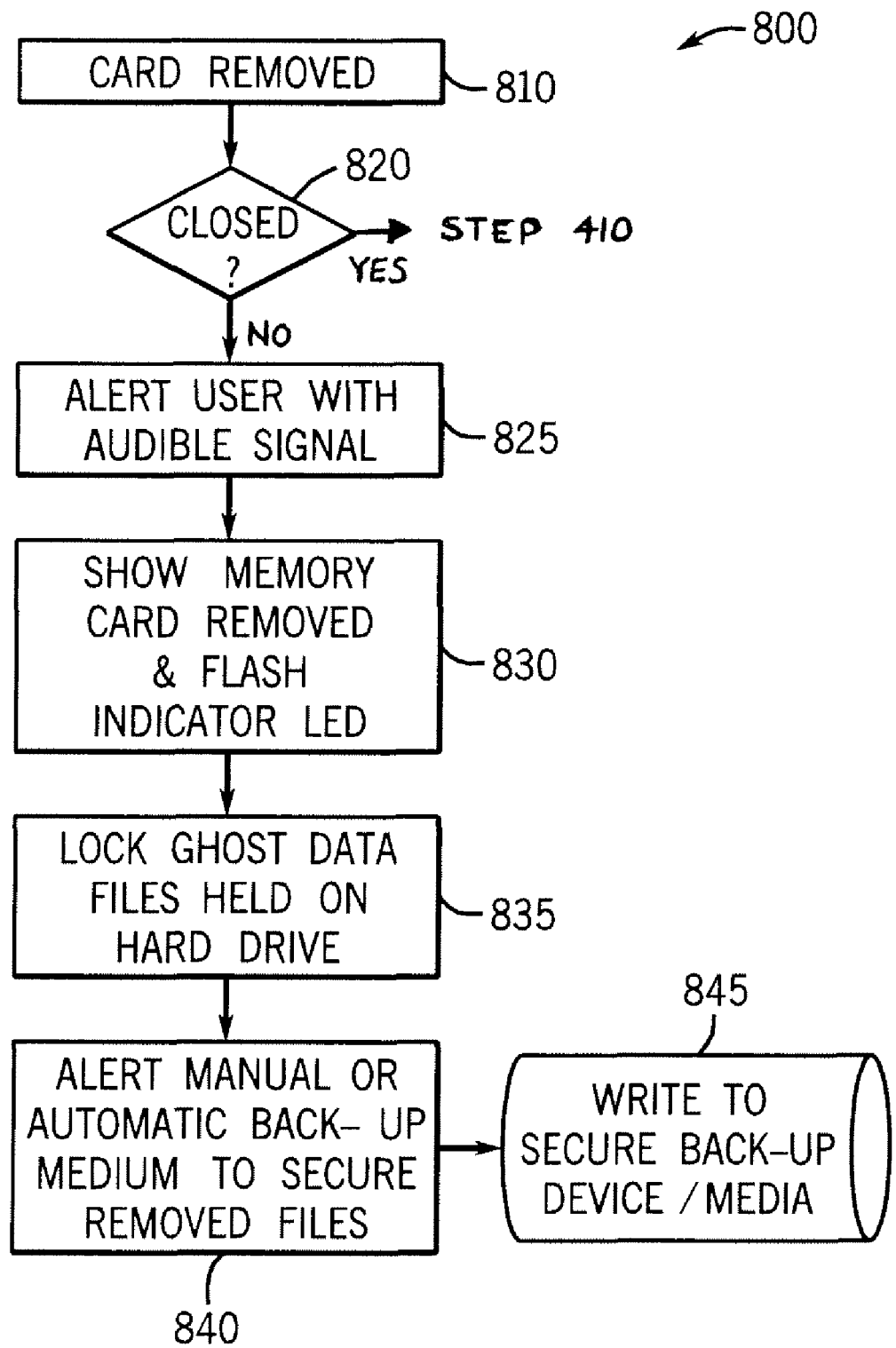
FIG. 8 shows a schematic flow diagram illustrative of an embodiment of a method to remove removable data storage mediums from the system.

FIG. 8 illustrates an embodiment of a method 800 of responding to detection of one of the series of removable data storage mediums 105, 110, 115, 120 physically or operationally removed so as to be unavailable to the system 100. Step 810 can include detecting removal of one of the series of removable data storage mediums 105, 110, 115, 120 from availability to receive storage of data. Step 820 can include detecting whether the system 100 recorded that the status of the removable data storage medium 105, 110, 115, 120 was closed according to the protocol described in method 800. If the system 100 does not detect that the status of the removable data storage medium 105, 110, 115, 120 was closed according to the protocol of method 700, step 825 can include creating an audible alert and step 830 can include creating a graphic illustration, both to alert the user of the removal of the removable data storage medium 105, 110, 115, 120 without proper protocol. If the system 100 does detect that the status of the removable data storage medium 105, 110, 115, 120 was closed according to the protocol of method 700, then the method 800 can return back to step 410 of method 400.

Step 835 can include detecting for and locking storage of the file of data (e.g. system data) held in a hard drive 230 that may or may not yet have been saved to one of the removeable data storage mediums 105, 110, 115, 120, where this file of data can be referred to as "ghost" files of data. "Locking" as used herein can be defined such that the file of data can be read but cannot be modified through editing, deleting or trying to over-write. Step 840 can include creating an alert instruction to duplicate the storage of the ghost files of data to either the backup medium 240 or another of the removeable data storage medium 105, 110, 115, 120. Step 845 can include writing or storing the ghost file data to the backup medium 240 or another of the removeable data storage medium 105, 110, 115, 120. An example of the alert of step 840 can be creating a visual instruction on the display 175 to instruct the user to manually perform the step 845, or a creating a visual instruction that step 845 can be automatically executing or being performed or has occurred or completed or executed. The steps 840 and 845 can result in or cause the duplicated storage of file of data to at least two independent sources, including the hard-drive 230 and either another of the removeable data storage medium 105, 110, 115, 120 or the backup medium 240. The method 800 can further include deleting this file data from the hard-drive 230 such that a copy of the file data of the patient (e.g. EMR) can be maintained both in the hospital backup medium 240 in addition to the duplicated file of data stored on the another of the removeable data storage medium 105, 110, 115, 120.

Figure 9:
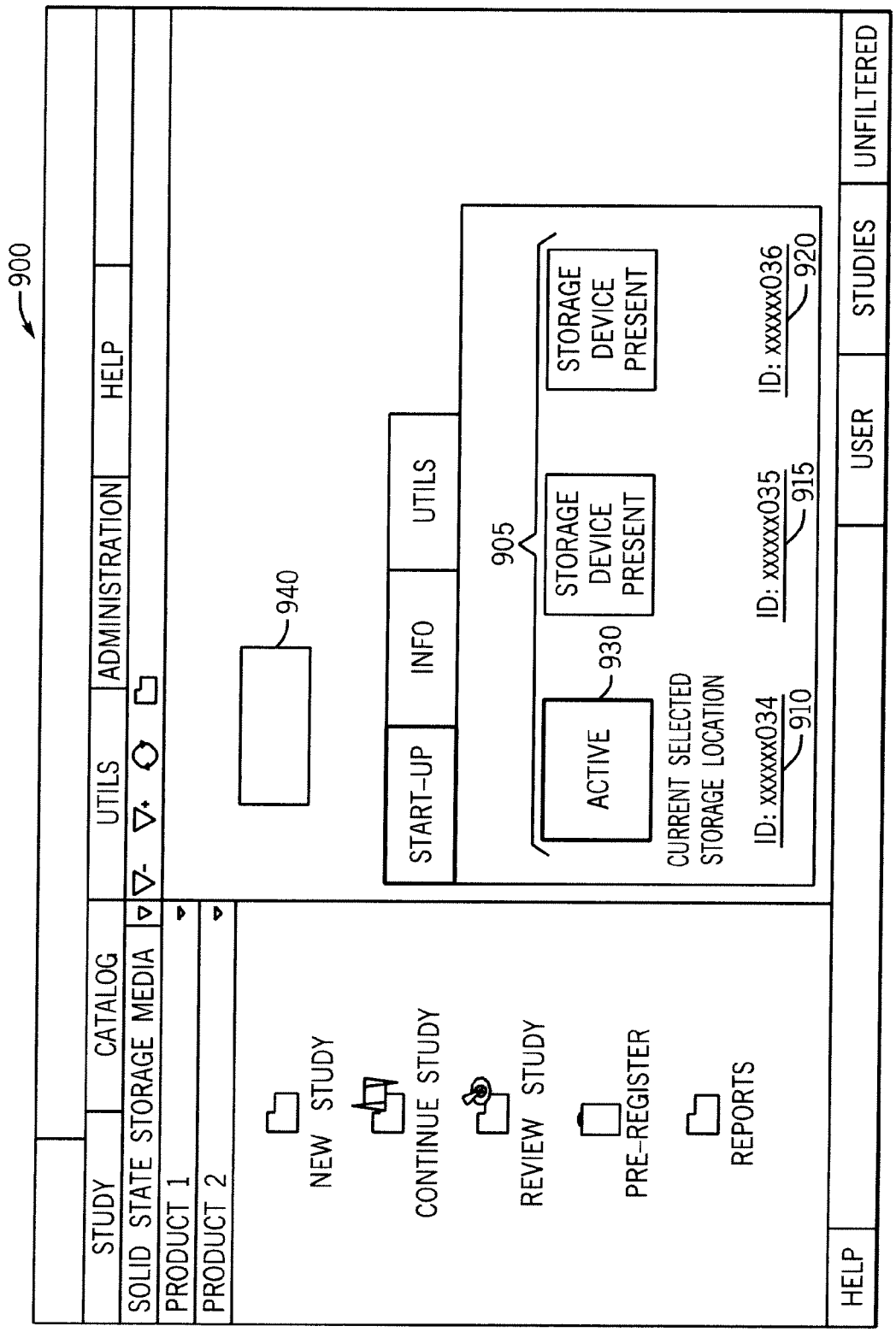
FIG. 9 shows a schematic diagram illustrative of an embodiment of a first display of the system of FIG. 1.

FIG. 9 illustrates an example of a visual display 900 generated or created according to the above-described methods 400, 600, 700, 800. This display 900 can include a MICROSOFT WINDOWS® platform or other operating platform (as described above) presentation of a graphic illustration of a map 905 of the removable data storage mediums 105, 110, 115 located on the system 100; a graphic illustration of a unique identification 910, 915, 920 of each of the removable data storage mediums 105, 110, 115, respectively; a graphic illustration 930 to identify which of the graphic illustrations unique identifications 910 correlated to the physical form of the removable data storage medium 105 can be of "ACTIVE" status to receive and store files of data from the medical device 125, to be distinguished from a remainder of the graphic illustrations of the unique identifiers 915, 920 correlated to the physical forms of the removable data storage mediums 110 and 115 available to the system 100 but not of status to receive data.

Still referring to FIG. 9, the system 100 via display 900 (or alternatively through the input device 225 in FIG. 1) can further include a selector 940 (mechanical button, graphic icon to click with mouse device, etc.) representative of a mode of increased importance or sensitivity of the storage of data received from the medical device 125. An embodiment of the selector 940 can be associated with critical care of the patient 130. By selection or actuation (e.g., actuation of switch, click of mouse device, touch-screen, etc.) of the selector 940, the system 100 automatically operates in mode that identifies at least two removable data storage mediums 105, 110 for redundant storage of data acquired from the medical device 125, such that each active removable data storage medium 105, 110 includes an identical directory with patient registry and storage of data.

Figure 10:
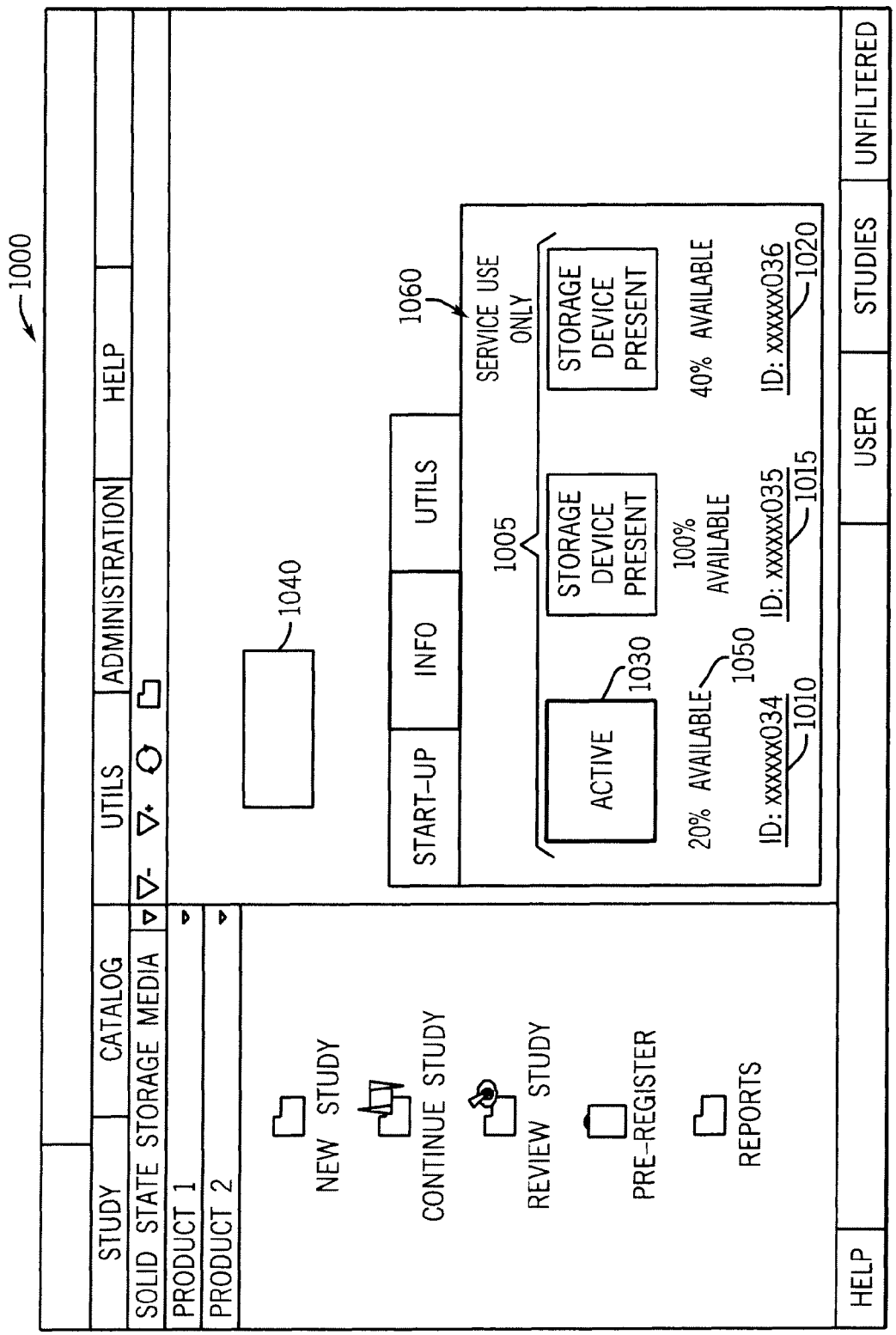
FIG. 10 shows a schematic diagram illustrative of an embodiment of a second display of the system of FIG. 1.

FIG. 10 illustrates another embodiment of a display 1000 generated or created by the system 100 according to the methods 400, 600, 700, and 800 described above. The display 1000 can include a MICROSOFT WINDOWS® platform (or other operating platform (as described above) presentation of a graphic illustration of a map 1005 of the removable data storage mediums 105, 110, 115 located on the system 100; a unique identification 1010, 1015, 1020 of each of the removable data storage mediums 105, 110, 115, respectively; a graphic illustration 1030 to indicate which of unique identifications 910 correlated to the removable data storage medium 105 of "ACTIVE" status to receive and store files of data from the medical device 125 to distinguish from a remainder of the unique identifiers 1015, 1020 correlated to the removable data storage mediums 10 and 115 available to the system 100 but not of status to receive data, and a graphic icon 1040 associated with selection of a mode of operation of increased sensitivity with the acquired data, similar in illustration and function to the display 900 described above. The display 1000 can further include graphic illustration 1050 of a measured value of available spare capacity of each removable data storage medium 105, 110, 115 detected on the system 100. The display 1000 can further include a graphic illustration 1060 indicative of a designated or restricted status of the removable data storage medium 115 to receive only a limited type of data from the medical device 125 for storage, or indicative of a designated or restricted status of the removable data storage medium to receive only data associated with operating parameters or default settings of the medical device 125 at a time range of acquiring and storing data to one of the other removable data storage mediums 105 or 110 associated with a patient identifier.

A technical effect of the system 100 and methods 400, 600, 700, 800 described herein includes to provide rapid, robust storage of data as created at acquisition (e.g., medical image acquisition); automated switching of archiving of the data with minimal to no loss of data, delay, or user interaction; sequencing of activation of memory devices (e.g., removable data storage mediums 105, 110, 115, 120) to support robust storage and archiving of data; feedback to user on of memory storage device status, capacity, and availability; and enhanced capability to load or store software for upgrades, backup, or disaster recovery. Removable data storage mediums (e.g., solid state memory devices (ssmd) such as memory cards) can provide an easy way to backup the system 100. With larger format/capacity solid-state memory cards in development, this system 100 and methods 400, 600, 700, 800 can become even more desirable with time. The system 100 and methods 400, 600, 700, 800 may also be used to load software either for upgrade or disaster recovery. The system 100 may also store elements that establish the final function on the removable data storage medium 105, 110, 115, 120. The ability to read this acquired data at high speed allows the system 100 to be more quickly, and easily restored to service in the event of failure. The system 100 also provides for the storage of a continuous stream of data acquired from the medical device 125 using available consumer available removable data storage mediums 105, 110, 115, 120, and provides for the storage of the continuous stream of data in general real time through multiple removable data storage mediums 105, 110, 115, 120 having a sequence to provide uninterrupted storage. It should be understood that a number of removable data storage mediums 105, 110, 115, 120 associated with the system 100 can vary and is not limiting.

Another technical effect of the system 100 and methods 400, 600, 700, 800 includes an ability to execute without user intervention. The indicators 155, 160, 165, 170 (e.g., LEDs or graphic illustrations on monitor) can advise the user of changes to mapping of the storage of acquired data to multiple removable data storage mediums 105, 110, 115, 120, and a new location of a current data file associated with a patient case correlated to the unique identifier of the removable data storage mediums 105, 110, 115, 120. The system 100 can also support an ability to execute hi-speed copying of data files from one removable data storage medium 105, 110, 115, 120 to another.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system in communication with a medical device comprising:
first and second removable data storage mediums independent of one another, wherein the first removable data storage medium and the second removable data storage medium are of the same type and are physically interchangeable with one another;
a database independent of the plurality of removable data storage mediums;
a graphic display; and
a controller in communication with the plurality of removable data storage mediums, the graphic display, and the medical device, the controller including a memory in communication with a processor, the memory including a plurality of computer readable program instructions for execution by the processor to perform the steps of:
detecting a spare capacity to store a file of data associated with a unique patient identifier acquired from the medical device to the first removable data storage medium,
storing a first list of identifiers of files of the data stored to the first removable data storage medium correlated to a first identifier of the first removable data storage medium, the first list of identifiers of files stored in the database,
determining if one or both of the first removable data storage medium or the second removable data storage medium is below a threshold spare capacity to receive the file of data associated with the unique patient identifier acquired from the medical device,
if the first storage medium is below the threshold spare capacity but the second storage medium is above the threshold spare capacity:
automatically causing to stop communicating data for storage to the first removable data storage medium and to start communicating the file of data associated with the unique patient identifier for storage to the second removable data storage medium,
storing a second list of files of the data stored to the second removable storage medium correlated to a second identifier of the second removable data storage medium, the second list stored to the database, and
creating a first graphic display indicating that the first removable data storage medium is above the threshold capacity and discontinued for receipt of additional data for storage, as well as illustrative of the second removable data storage medium as active to receive the file of data associated with the unique patient identifier;
if both the first storage medium and the second storage medium are below the threshold spare capacity:
generating a second graphic display indicating that none of the plurality of data storage mediums has the spare capacity to receive the file of data from the medical device.

2. The system of claim 1, further comprising the step of:
detecting a sequence of the plurality of removable data storage mediums to receive the file of data associated with the patient identifier for storage.

3. The system of claim 2, further comprising the step of:
detecting a spare capacity of each of the plurality of removable data storage mediums to receive data from the medical device; and
creating a display illustrative of the spare capacity of each of the plurality of removable data storage mediums.

4. The system of claim 3, further comprising the step of:
creating a display illustrative of a status of each of the plurality of removable data storage mediums below the threshold capacity to receive data from the medical device.

5. The system of claim 1, wherein the system includes a plurality of slots configured to receive and interface with the plurality of removable data storage mediums, respectively.

6. The system of claim 1, further comprising a graphic icon in the display that when selected causes the system to communicate the file of data to store on both of the first and second removable data storage mediums.

7. The system of claim 1, wherein the step of detecting if the spare capacity of the first or second removable data storage mediums is directed to receive all of the multiple files of data associated with the patient identifier.

8. The system of claim 1, further comprising the step of identifying one of the plurality of removable data storage mediums having a spare capacity to receive files of data associated with an operating parameters of the medical device when acquiring the file of data having the patient identifier, and receiving the file of data associated with the operating parameters at the one of the plurality of removable data storage mediums with the spare capacity to receive the file of data associated with the operating parameters.

9. A method to manage data acquired from a medical device, the method comprising the steps of:
detecting a spare capacity to store a file of data associated with a unique patient identifier acquired from a medical device to a first removable data storage medium,
storing a first list of files of the data stored to the first removable data storage medium correlated to a first identifier of the first removable data storage medium, the first list stored a database,
determining if one or both of the first removable data storage medium or a second removable data storage medium is below a threshold spare capacity to receive the file of data associated with the unique patient identifier acquired from the medical device,
if the first storage medium is below the threshold spare capacity but the second storage medium is above the threshold spare capacity:
automatically causing to stop communicating data for storage to the first removable data storage medium and starting to communicate the file of data associated with the unique patient identifier for storage to a second removable data storage medium, wherein the first removable data storage medium and the second removable data storage medium are of the same type and are physically interchangeable with one another,
storing a second list of files of the data stored to the second removable storage medium correlated to a second identifier of the second removable data storage medium, the second list stored to the database, the database independent of the first and second removable data storage mediums, and
creating a first graphic display indicating that the first removable data storage medium is above the threshold capacity and discontinued for receipt of additional data for storage, as well as illustrative of the second removable data storage medium as active to receive the file of data associated with the unique patient identifier;
if both the first storage medium and the second storage medium are below the threshold spare capacity;
generating a second graphic display indicating that none of the plurality of data storage mediums has the spare capacity to receive the file of data from the medical device.

10. The method of claim 9, further comprising the step of:
detecting a sequence of the plurality of removable data storage mediums to receive the file of data associated with the patient identifier for storage.

11. The method of claim 10, further comprising the steps of:
detecting a spare capacity of each of the plurality of removable data storage mediums to receive data from the medical device; and
creating a display illustrative of the spare capacity of each of the plurality of removable data storage mediums.

12. The method of claim 11, further comprising the step of:
creating a display illustrative of a status of each of the plurality of removable data storage mediums below the threshold capacity to receive data from the medical device.

13. The method of claim 9, further comprising the step of:
receiving each of the plurality of removable data storage mediums in a slot configured to interface with the respective removable data storage medium.

14. The method of claim 9, further comprising the step of:
creating a graphic icon in the display that when selected causes to communicate the file of data to store on both of the first and second removable data storage mediums.

15. The method of claim 9, wherein the step of detecting if a spare capacity of the first or second removable data storage mediums is directed to detecting if the spare capacity to receive all of a multiple of files of data associated with the patient identifier.

16. The method of claim 9, further comprising the step of:
identifying one of the plurality of removable data storage mediums having a spare capacity to receive files of data associated with a operating parameters of the medical device when acquiring the file of data having the patient identifier, and receiving the file of data associated with the operating parameters at the one of the plurality of removable data storage mediums with the spare capacity to receive the file of data associated with the operating parameters.

* * * * *